Patented Sept. 28, 1937

2,093,989

UNITED STATES PATENT OFFICE 2,093,989

PROCESS OF EFFECTING ELECTROCHEMICAL REDUCTIONS AND OXIDATIONS

Ernst Berl, Pittsburgh, Pa., assignor to The Mathieson Alkali Works, Inc., a corporation of Virginia No Drawing. Application November 1, 1934, Serial No. 751,031

9 Claims. (Cl. 204—9)

The present invention relates to processes of effecting electrochemical oxidations and reductions.

Heretofore, methods have been proposed for the direct production of hydrogen peroxide electro-chemically by passing oxygen under high pressure adjacent to metal cathodes, such as gold, and by using hydrogen liberated at the cathode for the reduction of this oxygen to hydrogen peroxide. Various attempts have been made to make the direct processes practical and satisfactory when operated commercially on an industrial scale, but, as far as I am aware, none of these attempts has been wholly successful, satisfactory and practical.

I have discovered a relatively simple process which avoids the disadvantages and shortcomings of prior processes and which eliminates the necessity for the use of expensive metal cathodes of gold or the like and the necessity for using high pressures.

It is an object of the present invention to provide a process of effecting electro-chemical oxidations and reductions in a simple and inexpensive electrolytic cell and under normal or atmospheric pressure.

It is another object of the invention to provide a process for the electrolytic reduction of substances like nitro-benzol.

A further object of the invention is to effect the direct electrochemical production of a solution of hydrogen peroxide capable of being used directly for bleaching and of a solid double compound of urea by means of hydrogen peroxide.

It is also within the contemplation of the invention to provide an electrolytic process employing an electrode of activated carbon containing graphite and provided with a thin coating of a hydrophobe substance like paraffin, gelatin, cellulose compounds, etc.

The invention also contemplates the provision of an electrolytic process of effecting oxidations and reductions which involves the continuous use of excess of gases.

Other objects and advantages will become apparent from the following description of preferred embodiments of carrying the invention into practice.

Broadly stated, the invention involves the production of hydrogen peroxide and other reduction products, such as those of nitro-benzene, and also the production of per salts and other oxidation products by bringing the substances to be reduced or to be oxidized in the neighborhood or region adjacent to the electrodes. I have found that the aforesaid processes can be conducted under normal or atmospheric pressure by using an electrode consisting partly or wholly of active carbon. In this manner increased or high pressures are not necessary and can be eliminated.

When the substances to be reduced or oxidized are gaseous, they are either conducted through porous cathodes or anodes or are passed in contact with or along the face of the electrodes in order to subject them to cathodic or anodic actions.

It is preferred to make the electrodes containing activated carbon good electrical conductors either by heating them to relatively high temperatures or by addition of graphite or similar substances which are good conductors of electricity. In order to eliminate too rapid moistening of the electrodes, they can be provided with an extremely thin coating of a hydrophobe material, such as ethyl, cellulose, or the like. In case the electrolysis is to be carried out in anhydrous liquids, the moistening can be eliminated by the use of other suitable substances, such as gelatin or the like.

Example No. 1

Air or oxygen or the like is conducted through a cylindrical electrode which is preferably made from a mixture of retort graphite and of highly activated carbon. For instance, the carbon may be produced according to the process described in United States Letters Patent No. 1,812,316 and/or United States Letters Patent No. 1,851,888. The cylindrical electrode is closed at the bottom.

A diluted solution of common salt (NaCl) is preferably used for electrolyte. When the circuit is completed, the hydrogen produced on the cathode reduces the oxygen absorbed by the activated carbon to hydrogen peroxide. Chlorine is obtained at the anode. The solution of the common salt is preferably passed by the cathode continuously, thereby producing a weak alkaline solution of hydrogen peroxide which can be used directly for bleaching purposes. In this manner, it is possible to produce with a high current efficiency of over 90%, a hydrogen peroxide which is excellent for bleaching purposes.

Example No. 2

A concentrated and cooled solution of potassium hydroxide is used as electrolyte. The oxygen liberated at the anode is conducted to a plate-like cathode made partly or completely of activated carbon. Oxygen from a different source or together with air is likewise conducted to the cathode.

Considerable current densities can be used and a solution of about 25% hydrogen-peroxide is obtained at the cathode with a current efficiency exceeding about 65%. It is posssible to introduce, for example, urea into the solution of alkaline hydrogen peroxide and produce the known double compound [CO(NH₂)₂.H₂O₂] directly in solid form.

Example No. 3

A concentrated solution of potassium chloride is introduced into the anode space and a dilute solution of potassium hydroxide into the cathode space. The solution can be carried continuously through both spaces. The cathode which is a good electrical conductor consists of a material suitably shaped and containing activated carbon. It is made difficult to be wetted or moistened by applying an extremely thin coating of ethyl cellulose to the surface of the cathode. Oxygen is passed continuously by and in contact with the cathode and leaves the cathode space. The oxygen carrying small quantities of hydrogen is passed, for example, over hot copper oxide in order to burn the hydrogen. After burning the hydrogen, the oxygen is returned to the cathode space. It is to be noted that with high current densities concentrated solutions of hydrogen peroxide are produced which, if necessary, can be treated with materials checking or preventing the dissociation of hydrogen peroxide in alkaline solutions. The chlorine at the anode can be utilized in any usual way.

Example No. 4

Potassium sulfate can be used as electrolyte and cathodes consisting completely or partly of activated carbon. As anodes one can use for instance lead or lead peroxide or molten ironoxide or manganese peroxide or the like. On the cathode there is a formation of hydrogen peroxide and alkali, and on the anode $H_2SO_4$ is formed. One can introduce the anolyte in the catholyte so that the alkali of the catholyte will be neutralized more or less by the acid anolyte. In some instances, another acid may be used to neutralize parts of the alkali formed in the catholyte. Care must be taken to prevent the catholyte from becoming acid. This procedure has the advantage of diminishing the alkali concentration in the hydrogen peroxide and therefore reducing the danger of a decomposition of the hydrogen peroxide.

Example No. 5

A solution of borax is electrolytically decomposed in accordance with the invention at an anode consisting partly or completely of activated, highly conductive carbon. An excellent yield of perborate solutions is obtained. Other per salts, such as perborate, persulfate, perphosphate and percarbonate, can be made in a similar manner.

Example No. 6

Using cathodes and anodes made partly or completely of highly conductive activated carbon, and using the above processes, it is possible to produce solutions, for example, of hydrogen peroxide at the cathode and solutions of per salts, for example, perborate, persulfate, perphosphate and of percarbonate at the anode.

It is to be observed that the present invention provides a process for producing dilute solutions of hydrogen peroxide by using an electrolyte containing sodium hydroxide, sodium chloride and potassium hydroxide, that the present invention provides a process for producing concentrated solutions of hydrogen peroxide by using potassium hydroxide or potassium chloride, or potassium sulfate and that the hydrogen peroxide may be produced at the cathode by a reduction of oxygen or at the anode by the oxidation of hydrogen.

It is also to be noted that the present invention provides a process of effecting electrochemical oxidations and reductions which may be carried into practice by using any appropriate electrolytic cell but which is preferably conducted in an electrolytic cell of the type disclosed and claimed in my companion application bearing Serial No. 566,155, issued as United States Letters Patent No. 2,000,815, May 7, 1935.

Although certain preferred embodiments of the invention have been described, it is to be noted that variations and modifications may be made within the purview of the invention as defined by the appended claims. Thus various activated carbons may be used but I prefer to use an activated carbon made from acid sludge or other activated carbons which have been made at a temperature above about 700° C.

The process can be carried out in cells in which the cathode space is separated from the anode space by a diaphragm of low resistance. One can use cells without diaphragms, for instance, cells similar to the so-called clock cells in which a neutral layer is formed between the lighter and the heavier part of the electrolytes. These cells without diaphragms must incorporate means for separating the catholyte from the anolyte.

I claim:—

1. The process of producing hydrogen peroxide which comprises electrolyzing solutions of alkali salts in the presence of a cathode containing active carbon and adding acid to the catholyte to maintin the latter in a neutral condition.

2. The process of producing hydrogen peroxide which comprises electrolyzing solutions of alkali salts in the presence of a cathode containing active carbon and adding acid to the catholyte to maintain the latter in a slightly alkaline condition.

3. The process of producing hydrogen peroxide which comprises electrolyzing solutions of alkali salts in the presence of a cathode containing active carbon, and adding a portion of the acid anolyte to the catholyte in such amount that the reaction of the catholyte will be neutral.

4. The process of producing hydrogen peroxide which comprises electrolyzing solutions of alkali salts in the presence of a cathode containing active carbon, and adding a portion of the acid anolyte to the catholyte in such amount that the reaction of the catholyte will be slightly alkaline.

5. A continuous process for producing hydrogen peroxide which comprises electrolyzing a solution containing sodium chloride in the presence of a cathode containing active carbon, passing an oxygen-containing gas in contact with said cathode whereby hydrogen liberated electrolytically reduces oxygen adsorbed by said active carbon, whereby hydrogen peroxide is produced, and recovering the said hydrogen peroxide as a weak alkaline solution of hydrogen peroxide by continuously passing a solution containing sodium chloride past the said cathode.

6. The process of producing hydrogen peroxide which comprises electrolyzing a solution containing an alkali salt in the presence of a cathode containing active carbon, passing an oxygen-containing gas in contact with said cathode and adding acid to the catholyte in an amount sufficient to maintain the latter in a substantially neutral condition, but insufficient to render the catholyte acid.

7. A continuous process for producing hydrogen peroxide which comprises electrolyzing a solution containing an alkali metal salt in the presence of a cathode containing active carbon, passing an oxygen-containing gas in contact with said cathode whereby hydrogen liberated electrolytically reduces oxygen adsorbed by said active carbon whereby hydrogen peroxide is produced, and recovering the said hydrogen peroxide as a weak alkaline solution of hydrogen peroxide by continuously passing the solution containing an alkali metal salt past the said cathode.

8. A continuous process for producing hydrogen peroxide which comprises electrolyzing a solution containing potassium chloride in the presence of a cathode containing active carbon, passing an oxygen-containing gas in contact with said cathode whereby hydrogen liberated electrolytically reduces oxygen adsorbed by said active carbon whereby hydrogen peroxide is produced, and recovering the said hydrogen peroxide as a weak alkaline solution of hydrogen peroxide by continuously passing the solution containing potassium chloride past the said cathode.

9. A continuous process for producing hydrogen peroxide which comprises electrolyzing a mixture of sodium chloride and potassium chloride in the presence of a cathode containing active carbon, passing an oxygen-containing gas in contact with said cathode whereby hydrogen liberated electrolytically reduces oxygen adsorbed by said active carbon, whereby hydrogen peroxide is produced, and recovering the said hydrogen peroxide as a weak alkaline solution of hydrogen peroxide by continuously passing the mixture of sodium chloride and potassium chloride past the said cathode.

ERNST BERL.